US012715957B2

(12) United States Patent
Zhenlong et al.

(10) Patent No.: US 12,715,957 B2
(45) Date of Patent: Aug. 25, 2026

(54) EPOXY CURING AGENTS AND USES THEREOF

(71) Applicant: EVONIK OPERATIONS GMBH, Essen (DE)

(72) Inventors: Yan Zhenlong, Shanghai (CN); Shiying Zheng, Center Valley, PA (US); Michael Cook, Nuneaton (GB)

(73) Assignee: Evonik Operations GmbH, Essen (DE)

( * ) Notice: Subject to any disclaimer, the term of this patent is extended or adjusted under 35 U.S.C. 154(b) by 481 days.

(21) Appl. No.: 18/276,616

(22) PCT Filed: Feb. 4, 2021

(86) PCT No.: PCT/CN2021/075361
§ 371 (c)(1),
(2) Date: Aug. 9, 2023

(87) PCT Pub. No.: WO2022/165729
PCT Pub. Date: Aug. 11, 2022

(65) Prior Publication Data
US 2024/0317927 A1 Sep. 26, 2024

(51) Int. Cl.
*C08G 59/18* (2006.01)
*C08G 59/40* (2006.01)
*C08L 63/00* (2006.01)
*C09D 163/00* (2006.01)

(52) U.S. Cl.
CPC ....... *C08G 59/184* (2013.01); *C08G 59/4021* (2013.01); *C09D 163/00* (2013.01); *C08L 63/00* (2013.01)

(58) Field of Classification Search
CPC ......................... C08G 59/184; C08G 59/4021; C09D 163/00; C08L 63/00
See application file for complete search history.

(56) References Cited

U.S. PATENT DOCUMENTS 4,197,389 A * 4/1980 Becker ................. C08G 59/184 523/420
4,246,148 A * 1/1981 Shimp .................. C08G 59/184 523/400
4,608,405 A * 8/1986 DeGooyer ............. C08G 59/56 564/348
5,032,629 A * 7/1991 Hansen ................ C08G 59/184 564/325
5,246,984 A 9/1993 Darwen et al.
5,508,324 A 4/1996 Cook
6,245,835 B1 * 6/2001 Klein .................. C09D 163/00 523/424
9,550,912 B2 * 1/2017 Flosser ................ C08G 59/184

FOREIGN PATENT DOCUMENTS

CA 2309699 C * 4/2009 ........... C09D 163/00
WO WO-9925768 A1 * 5/1999 ........... C08G 59/184

OTHER PUBLICATIONS

PCT International Search Report of the international Searching Authority malled Jul. 19, 2021.

* cited by examiner

*Primary Examiner* — Rabon A Sergent
(74) *Attorney, Agent, or Firm* — Andrew H. Chung; Linda S. Li; Jason S. Ngui

(57) ABSTRACT

The present invention discloses a waterborne amine curing agent, process of making such curing agent, and curable amine-epoxy compositions. The curing agent comprises the product of the reaction of a first polyamine containing primary amine functionality and a first polyepoxide in a ratio of moles of polyamine per equivalents of polyepoxide sufficient to provide an amine terminated intermediate (a) comprising an adduct of about two moles of polyamine and one mole polyepoxide, intermediate (a) being then reacted with urea or formaldehyde to provide an amine terminated intermediate (b), intermediate (b) being then reacted with a second polyepoxide to provide an amine terminated intermediate (c), intermediate (c) being end capped with a monoepoxide composition comprising an aromatic glycidyl ether or an alkyl substituted aromatic glycidyl ether, or a combination of both, to form a polyamine-polyepoxide adduct, and contacting the polyamine-polyepoxide adduct with a second polyamine having two or more active amine hydrogens.

20 Claims, 1 Drawing Sheet

Differentiation performance test: full formulation coating performance cured under high temperature with high humidity for 7 days (50°C/98% relative humidity)-Adhesion test
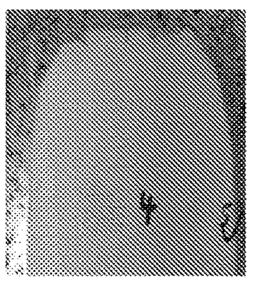
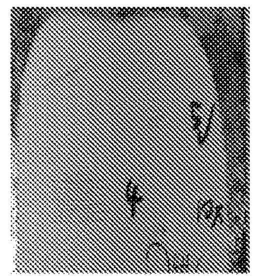
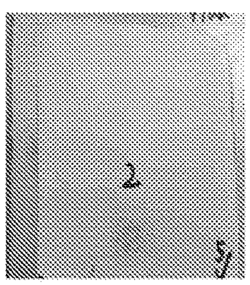
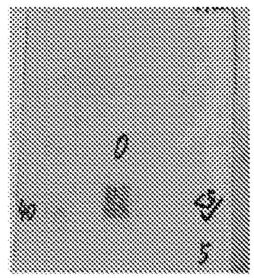
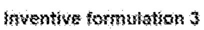
Inventive formulation 3 Inventive formulation 4 Comparative formulation 5 Comparative formulation 6

EPOXY CURING AGENTS AND USES THEREOF

This Application is a § 371 national stage of PCT International Application No. PCT/CN2021/075361, filed Feb. 4, 2021, the contents of which are hereby incorporated by reference in its entirety into this application.

FIELD OF THE INVENTION

The present invention relates to curing agents for epoxy resins suitable for use in waterborne applications, curable amine-epoxy compositions derived from such curing agents, and articles produced from such compositions. The invention particularly relates to polyamine-epoxy adducts as curing agents.

BACKGROUND OF THE INVENTION

Due to more stringent environmental regulations, particularly with respect to reduced volatile organic compounds (VOCs), there is a drive within the coatings industry to switch from conventional solvent borne systems to waterborne coatings. Although waterborne polyepoxide coating systems are known, there have been deficiencies associated with these systems. For example, many aqueous systems show poor humidity resistance in metal coatings at thin films, causing loss of adhesion and early corrosion failure. Also most systems have high amine hydrogen equivalent weight (AHEW) resulting in high use level. The working pot life of several commercial aqueous epoxy coating compositions can be too short and as a result systems cannot be used in certain industrial applications.

U.S. Pat. No. 9,550,912 describes water dilutable polyamine adducts formed by the reaction of a first polyamine with a bisphenol diglycidyl ether and further formulated with a second polyamine to form a waterborne curing agent solution with low use level when curing epoxy.

U.S. Pat. No. 6,245,835 describes amino-epoxy adduct curing agents prepared by reacting a polyoxyalkylenediamine with a polyepoxide and polyoxyalkylene glycol diglycidyl ether and emulsifying the reaction product in water.

U.S. Pat. No. 5,508,324 describes waterborne curing agent composition of a polyamine-epoxy adduct which is end capped with an aromatic monoepoxide to improve compatibility between resin and curing agent.

U.S. Pat. No. 5,246,984 describes water compatible polyamine adducts formed by the reaction of an amine terminated adduct and a resin compatible adduct. Both adducts are the reaction product of a polyamine with a mixture of monoepoxides and polyepoxides. The resultant mixture is further reacted with formaldehyde to reduce the primary amine content of the product.

U.S. Pat. No. 5,032,629 describes water compatible polyamine-epoxy adducts prepared by reacting poly(alkylene oxide) mono- or diamines with a polyepoxide to form intermediates which are then subsequently reacted with an excess of a polyamine.

U.S. Pat. No. 4,608,405 describes curing agents based upon a polyamine adduct formed by the reaction with a mixture of diglycidyl ether of polyether polyol and bisphenol A wherein each primary amine in the resulting reaction product is further reacted with a monoepoxide or a monocarboxylic acid.

U.S. Pat. No. 4,246,148 discloses a polyamine terminated difunctional epoxy adduct which is end capped with various of monoepoxides or acrylonitrile.

U.S. Pat. No. 4,197,389 discloses a curing agent prepared by reacting at least one polyepoxide compound with at least one polyalkylene polyether polyol to form an adduct which is subsequently reacted with a polyamine.

BRIEF SUMMARY OF THE INVENTION

The present invention discloses a waterborne amine curing agent, process of making such curing agent, and curable amine-epoxy compositions. The curing agent (A) in accordance with the present invention comprises the product of the reaction of a first polyamine containing primary amine functionality and a first polyepoxide having an epoxide equivalent weight (EEW) of 130 to about 500 in a ratio of moles of polyamine per equivalents of polyepoxide sufficient to provide an amine terminated intermediate (a) comprising an adduct of about two moles of polyamine and one mole polyepoxide, intermediate (a) being then reacted with urea or formaldehyde to provide an amine terminated intermediate (b), intermediate (b) being then reacted with a second polyepoxide having an EEW of 200 to about 1000 to provide an amine terminated intermediate (c), intermediate (c) being end capped with a monoepoxide composition comprising an aromatic glycidyl ether or an alkyl substituted aromatic glycidyl ether, or a combination of both, to form a polyamine-polyepoxide adduct, and contacting the polyamine-polyepoxide adduct with a second polyamine having two or more active amine hydrogens, wherein the second polyamine is different from the first polyamine.

The curing agent (A) of the invention has an amine hydrogen equivalent weight of 80 to 400, or 100 to 300, or 100 to 250, or 100 to 200, and contain at least 40%, or 50%, or 60%, or 65%, or 70%, or 80% by weight of non-volatile organic compounds.

In one aspect of the invention, the curing agent comprises the contact product of a polyamine-polyepoxide adduct made from a first polyamine and a first polyepoxide, a second polyamine having two or more active amine hydrogens which is different from the first polyamine, and water. Water solubility of the curing agent can be improved by salting with an acid.

The curing agent can be used in a water based system to cure solid epoxy resin dispersions or liquid epoxy resin or liquid epoxy resin emulsion. Thus, another aspect of the present invention is a curable amine-epoxy composition comprising the reaction product of curing agent (A) and a polyepoxide resin composition (B), wherein the curing agent comprises the contact product of a polyamine-polyepoxide adduct made from a first polyamine and a first polyepoxide, and a second polyamine having two or more active amine hydrogens which is different from the first polyamine, and the polyepoxide resin composition comprises at least one multifunctional epoxy resin having at least two epoxide groups per molecule.

Another aspect of the present invention is a curable amine-epoxy composition comprising the reaction product of a curing agent and a polyepoxide resin composition, wherein the curing agent comprises the contact product of a polyamine-polyepoxide adduct made from a first polyamine and a first polyepoxide, a second polyamine having two or more active amine hydrogens which is different from the first polyamine, and water, and the polyepoxide resin composition comprises at least one multifunctional epoxy resin having at least two epoxide groups per molecule.

Articles of manufacture produced from the amine-epoxy compositions disclosed herein include, but are not limited to, adhesives, coatings, primers, sealants, curing compounds, construction products, flooring products, or composite products. Further, such coatings, primers, sealants, or curing compounds can be applied to metal or cementitious substrates that possess excellent physical and chemical properties.

BRIEF SUMMARY OF THE DRAWINGS

FIG. 1 shows the results of a differentiation performance test for inventive formulation 3, inventive formulation 4, comparative formulation 5 and comparative formulation 6.

DETAILED DESCRIPTION OF THE INVENTION

According to the invention the waterborne curing agent comprises the product of the reaction of a first polyamine containing primary amine functionality and a first polyepoxide having an epoxide equivalent weight (EEW) of 130 to about 500 in a ratio of moles of polyamine per equivalents of polyepoxide sufficient to provide an amine terminated intermediate (a) comprising an adduct of about two moles of polyamine and one mole polyepoxide, intermediate (a) being then reacted with urea or formaldehyde to provide an amine terminated intermediate (b), intermediate (b) being then reacted with a second polyepoxide having an EEW of 200 to about 1000 to provide an amine terminated intermediate (c), intermediate (c) being end capped with a monoepoxide composition comprising an aromatic glycidyl ether or an alkyl substituted aromatic glycidyl ether, or a combination of both, to form a polyamine-polyepoxide adduct, and contacting the polyamine-polyepoxide adduct with a second polyamine having two or more active amine hydrogens, wherein the second polyamine is different from the first polyamine.

In a preferred embodiment, excess first polyamine is removed from intermediate (a) by distillation to yield an amine terminated adduct intermediate (ai), intermediate (ai) then being reacted with the urea or formaldehyde to form the amine terminated intermediate (b).

In another preferred embodiment, the first polyamine has an amine hydrogen equivalent weight (AHEW) from about 12 to about 50.

In another preferred embodiment, intermediate (a) comprises an adduct of about two moles of polyamine and one mole of polyepoxide.

In another preferred embodiment, the amount of urea or formaldehyde reacted with intermediate (a) is about 0.5% to 8% by weight to total weight of intermediate (a).

In another preferred embodiment, the amount of second polyepoxide reacted with intermediate (b) is about 1% to 30% by weight to total weight of intermediate (b).

In another preferred embodiment, the amount of monoepoxide composition reacted with intermediate (c) is about 1% to 25% by weight to total weight of intermediate (c).

In another preferred embodiment, the second polyamine has an amine hydrogen equivalent weight (AHEW) from about 12 to about 100.

In another preferred embodiment, the amount of polyamine-polyepoxide adduct in the curing agent is 70% to 98% by weight to total weight of curing agent.

In another preferred embodiment, the amount of second polyamine in the curing agent is about 2% to 30% by weight to total weight of curing agent.

In one embodiment, the waterborne curing agent comprises the contact product of a polyamine-polyepoxide adduct made from a first polyamine and a first polyepoxide, and a second polyamine having two or more active amine hydrogens which is different from the first polyamine, wherein the polyamine-polyepoxide adduct comprises the reaction product of a first polyamine containing primary amine functionality, and a first polyepoxide having an epoxide equivalent weight (EEW) in the range of 130 to about 2000, wherein the first polyamine may have an amine hydrogen equivalent weight (AHEW) from about 12 to about 50, and the first polyepoxide having an epoxide equivalent weight (EEW) in the range of 130 to about 500. The ratio of first polyamine to first polyepoxide is greater than one mole of polyamine per equivalent of epoxide to yield an amine terminated adduct intermediate (a) which comprises an adduct of about two moles of polyamine and one mole of polyepoxide, intermediate (a) is further reacted with urea or formaldehyde by reacting about 0.5% to 8% by weight to total weight of intermediate (a) to yield an amine terminated intermediate (b), intermediate (b) is further advanced via reaction with a polyepoxide having an epoxide equivalent weight (EEW) in the range of 200 to about 1000 by reacting about 1% to 30% by weight to total weight of intermediate (b) to yield an amine terminated adduct intermediate (c), intermediate (c) is end capped with a monoepoxide composition comprising an aromatic glycidyl ether or an alkyl substituted aromatic glycidyl ether, or a combination of both, by reacting about 1% to 25% by weight to total weight of intermediate (c) to yield the polyamine-polyepoxide adduct (i). Polyamine-polyepoxide adduct (i) is further blended with a second polyamine (ii) having AHEW from 12 to 100. The amount of adduct (i) in the curing agent is 70% to 98% by weight to total weight of curing agent, and the amount of the second polyamine (ii) in the curing agent is about 2% to 30% by weight to total weight of curing agent.

The term “contact product” is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Combining additional materials or components can be done by any method known to one of skill in the art.

The first polyamine useful in preparing polyamine-polyepoxide adduct (i), and the second polyamine (ii) useful in preparing the curing agent each contains at least two nitrogen atoms per molecule and at least two and preferably at least three active hydrogens attached to nitrogen atoms per molecule. Useful polyamines include aliphatic, polyether, araliphatic, aromatic, cycloaliphatic, and heterocyclic di- and polyamines. Examples include the polyalkylene polyamines, especially the polyethylene polyamines (ethylene diamine, diethylene triamine, triethylene tetramine, pentaethylene hexamine and the like), 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 2-methyl-1,5-pentanediamine, such as N-3-aminopropyl ethylenediamine (N3), N,N'-bis (3-aminopropyl) ethylenediamine (N4, Available as Ancamine® 2655 from Evonik Corporation), N,N,N'-tris(3-aminopropyl) ethylenediamine (N5), N-3-aminopropyl diethylenetriamine (N4); N-3-aminopropyl-[N'-3-[N-3-aminopropyl]aminopropyl]diethylenetriamine (N6); N,N'-bis(3-aminopropyl)diethylenetriamine (N5); N,N-bis(3-aminopropyl)diethylenetriamine (N5); N,N,N'-tris(3-aminopropyl)diethylenetriamine (N6); N,N',N''-tris(3-aminopropyl)diethylenetriamine (N6); N,N,N',N'-tetrakis(3-aminopropyl)diethylenetriamine (N7); N,N-bis(3-aminopropyl)-[N'-3-[N-3-aminopropyl]aminopropyl]-[N'-3-aminopropyl]diethylenetriamine (N8); N-3-aminopropyl-[N'-3-[N-3-aminopropyl]aminopropyl]-[N'-3-aminopropyl] diethylenetriamine (N7); polypropyleneamines such as propylenediamine, dipropylenetriamine, tripropylenetetramine, and aminopropylated propylenediamines such as N,N,N'-tris(3-aminopropyl)-1,3-diaminopropane, and the like, araliphatic such as metaxylylene diamine, polyetheramine or poly(alkylene oxide) amine including diamines and triamines commercially available under the Jeffamine® name from Huntsman Corporation, such as for example Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or bis(3-aminopropyl) diethylene glycol ether (available as Ancamine® 1922A from Evonik Corporation), or combinations thereof; cycloaliphatic polyamines such as 1,2-diamino-cyclohexane, 1,3-diaminocyclohexane, 1,4-diaminocyclohexane, isophorone diamine, 3,3'-dimethyl-4,4'-diaminodicyclohexyl methane, 4,4'-diaminodicyclohexyl methane, 2,4'-diaminodicyclohexyl methane, hydrogenated ortho-toluenediamine, hydrogenated meta-toluenediamine, hydrogenated metaxylylene diamine (referred to commercially as 1,3-BAC), the mixture of methylene bridged poly (cyclohexylaromatic)amines (also known as MBPCAA or MPCA) described in U.S. Pat. No. 5,280,091; aromatic amines such as phenylene diamine, 4,4'-diaminodiphenyl methane, toluene diamine, bis(p-aminophenyl)methane, and bis(p-aminophenyl)sulfone, heterocycloaliphatic amine such as aminoethylpiperazine, and polyaminoamides. Mixtures of the above amines may also be employed. The first polyamine is an amine different from the second polyamine.

The preferred first polyamines useful in preparing polyamine-polyepoxide adduct (i) in the invention are the polyethylene polyamines, namely ethylenediamine (EDA), diethylene triamine (DETA) and especially triethylenetetramine (TETA), tetraethylenepentamine (TEPA), pentaethylenehexamine (PEHA), and mixtures thereof, and aminopropylated ethylenediamines such as N-3-aminopropyl ethylenediamine (N3), N,N'-bis(3-aminopropyl) ethylenediamine (N4, available as Ancamine® 2655 from Evonik Corporation), N,N,N'-tris(3-aminopropyl) ethylenediamine (N5), N-3-aminopropyl diethylenetriamine (N4); N-3-aminopropyl-[N'-3-[N-3-aminopropyl]aminopropyl]diethylenetriamine (N6); N,N'-bis(3-aminopropyl)diethylenetriamine (N5); N,N-bis(3-aminopropyl)diethylenetriamine (N5); N,N,N'-tris(3-aminopropyl)diethylenetriamine (N6); N,N',N''-tris(3-aminopropyl)diethylenetriamine (N6); polypropyleneamines such as propylenediamine, dipropylenetriamine, tripropylenetetramine, and aminopropylated propylenediamines such as N,N,N'-tris(3-aminopropyl)-1,3-diaminopropane, and the like.

The polyepoxide useful for preparing polyamine-polyepoxide adduct (i) contains about 2 or more 1,2-epoxy groups per molecule. Examples include epoxides of polyunsaturated organic compounds, oligomers of epichlorohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like.

Useful polyepoxides are glycidyl ethers of polyvalent alcohols including aliphatic or cycloaliphatic alcohols, such as glycidyl ethers of neopentyl, ethylene, propylene, and butylene glycol, trimethylol-propane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodcecanediol, 1,2-cyclohexanediol, 1,4-cyclohexane-diol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxides, polyvinyl alcohol, polyallyl alcohol, and the like. The glycidyl derivatives include triglycidyl isocyanurate.

Useful polyepoxides also include glycidyl ethers of polyhydric phenols such as the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as bisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

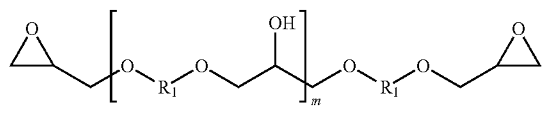

where m is a number between 0 to 10, and $R_1$ is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of dihydric phenol. The materials are invariably mixtures which can be characterized by an average value of m, which is not necessarily a whole number. Polymeric materials with an average value of m between 0 and about 7 are preferably used.

Other polyepoxides useful in this invention include the epoxy novolac resins, which are the glycidyl ethers of novolac resins. Novolac resins are the reaction product of a mono- or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about C4. The novolacs typically are complex mixtures with different degrees of hydroxyl functionality. For the purposes of this invention useful functionalities range from about 2 to about 4.

Other polyepoxides useful in this invention include the epoxy resin produced from epihalohydrin and an amine, wherein suitable amines can be diaminodiphenylmethane, aminophenol, xylenediamine, anilines, and the like, or combinations thereof, or resins produced from epihalohydrin and a carboxylic acid, wherein suitable carboxylic acids include phthalic acid, isophthalic acid, terephthalic acid, tetrahydro- and/or hexahydrophthalic acid, endomethylenetetrahydrophthalic acid, methylhexahydrophthalic acid, and the like, and combinations thereof.

The preferred polyepoxides are the diglycidyl ethers of bisphenol-A (DGEBA) and bisphenol-F, where m ranges from about 0 to about 7, and epoxy novolacs derived from phenol and formaldehyde with an average functionality of about 2 to about 4. Most preferred are diglycidyl ethers of bisphenol-A and diglycidyl ethers of bisphenol-F.

The intermediate (a) reaction products can be prepared over a wide range of reactant ratios. The amine must be employed in sufficient excess (greater than one mole of polyamine per equivalent of epoxide), so as to minimize chain extension and substantially afford an amine terminated adduct of two molecules of polyamine and one molecule of polyepoxide and to avoid unacceptably high viscosities in the final product. The reactant ratio may be 1.5 to 10 or more moles polyamine per equivalent of epoxide, preferably 2 to 6, desirably about 4 moles per equivalent of epoxide. Excess polyamine should be removed, preferably via vacuum distillation for volatile polyamines, to yield the isolated adduct of two molecules of polyamine and one molecule of polyepoxide. The excess polyamine should be removed to the extent that intermediate (a) has a free polyamine content of <10% by weight, preferably <7 wt %, or <5 wt %, or <4 wt %.

The polyepoxide resins used to adduct intermediate (a) are those types of polyepoxides taught above as suitable for use in making intermediate (a) but having an EEW of 130-500, preferably 180-500 and more preferably 180-300. It is preferred to use type 1, solid epoxy resins to advance intermediate (a). Adequate performance may be achieved if advancement is made with a liquid resin; however, the level of secondary adduction would need to be high in order to achieve the degree of compatibility observed via adduction with type 1 resins. High molecular weights (EEW>1000) can be used in this invention, but such materials are likely to have an adverse effect on the viscosity of the final product.

Intermediate (a), preferably as the isolated adduct, is further reacted with urea or formaldehyde by reacting about 0.5% to 8% by weight to total weight of intermediate (a), to yield an amine terminated intermediate (b). This reaction step reduces primary amine content, increases molecular weight, and also improves water compatibility and solubility. This approach is more advantageous than preparing intermediate (a) from the first polyamine with high molecular weight polyepoxide to reach high molecular weight, also offers lower viscosity.

Intermediate (b) is further advanced with a polyepoxide, preferably with a type I solid epoxy resin to yield intermediate (c). The polyepoxide resins used to adduct intermediate (a) are those types of polyepoxides taught above, having an EEW of 200-1000, most preferably 400-1000. High molecular weights (EEW>2000) can be used in this invention, but such materials are likely to have an adverse effect on the viscosity of the final product. The ratio of reactants is such that intermediate (b) is in excess, namely a ratio of about 1% to 30% by weight of polyepoxide to total weight of intermediate (b) or 0.0004 to 0.12 mol epoxy resin per mol intermediate (b). At low ratio of adduction (<1% weight or <0.0004 mol), the final products do not possess sufficient compatibility with epoxy resin dispersions and coatings exhibit poor surface appearance. Higher ratios of adduction (>30% weight or >0.12 mol) have an adverse effect on final product viscosity.

Intermediate (c) is then end capped with a monoepoxide composition comprising an aromatic glycidyl ether and/or alkyl substituted aromatic glycidyl ether, in a ratio of at least one mole aromatic monoepoxide per primary amine in intermediate (c) to yield polyamine-polyepoxide adduct (i).

Specific monoepoxide end capping agents useful in this invention are the aromatic and alkyl substituted aromatic monoglycidyl ethers or styrene oxide. The aromatic monoglycidyl ethers include phenyl glycidyl ether (PGE), and alkyl phenyl glycidyl ethers containing a C1 to C15 alkyl such as cresyl glycidyl ethers (CGE), t-butyl phenyl glycidyl ether, nonyl phenyl glycidyl ether and the glycidyl ether of cashew nut oil, commercially available as Cardolite™ NC513 marketed by Cardolite Corporation in Pennsylvania. Cardolite NC513 is a phenyl glycidyl ether containing a C15 alkyl group attached to the aromatic ring. Other monoglycidyl ethers such as the aliphatic glycidyl ether including butyl glycidyl ether can also be used in combination provided at least 65% aromatic monoglycidyl ether is used.

The purpose of end capping the adduct mixture is to reduce primary amine, improve system compatibility and increase hydrophobicity and flexibility. It can also serve to extend pot life. The level of end capping agents must be by reacting 1% to 25% by weight to total weight of intermediate (c). Levels less than this will result in coating formulations having less than suitable pot lives. The examples of this invention have used end capping levels ranging from 3-25%, the preferred level is 10-25%.

Adduct (i) is further blended with a second polyamine (ii) having AHEW from about 12 to about 100. The amount of adduct (i) in the curing agent is 70% to 98% by weight to total weight curing agent, or 50% to 90% by weight, or 60% to 90% by weight to total weight of the curing agent. And the amount of the second polyamine (ii) in the curing agent is about 2% to 30% by weigh to total weight of curing agent, or 4% to 30% by weight, or 4% to 25% by weight, or 4% to 20% by weight to the total weight of the curing agent.

Suitable second polyamine (ii) useful in preparing the curing agent of the invention are taught above. The preferred types of second polyamines (ii) are polyetheramine or poly(alkylene oxide) amine, such as for example Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, bis(3-aminopropyl) diethylene glycol ether (available as Ancamine® 1922A, from Evonik Corporation), or combinations thereof; and cycloaliphatic polyamines such as 1,2-diamino-cyclohexane, 1,3-diaminocyclohexane, 1,4-diaminocyclohexane, isophorone diamine, 3,3'-dimethyl-4,4'-diaminodicyclohexyl methane, 4,4'-diaminodicyclohexyl methane, 2,4'-diaminodicyclohexyl methane, hydrogenated ortho-toluenediamine, hydrogenated meta-toluenediamine, hydrogenated meta-xylylene diamine (referred to commercially as 1,3-BAC), the mixture of methylene bridged poly (cyclohexylaromatic)amines (also known as MBPCAA or MPCA), and araliphatic amines such as meta-xylylene diamine.

In some preferred embodiments, the second polyamines (ii) useful in preparing the curing agent of the invention are polyetheramine Jeffamine® D-230, Jeffamine® D-400, Jeffamine® D-2000, Jeffamine® T-403, bis(3-aminopropyl) diethylene glycol ether (available as Ancamine® 1922A, from Evonik Corporation); or cycloaliphatic polyamines such as 1,2-diamino-cyclohexane, isophorone diamine, 4,4'-diaminodicyclohexyl methane, hydrogenated metaxylylene diamine (referred to commercially as 1,3-BAC), the mixture of methylene bridged poly(cyclohexylaromatic)amines (also known as MBPCAA or MPCA), and araliphatic amines such as metaxylylene diamine.

Water can be added to the mixture of adduct (i) and the second polyamine (ii) to yield the curing agent of the invention. The amount of water can range from 5% to 50% by weight, or 5% to 40% by weight, or 5% to 30%, or 5% to 20%, or 5% to 15% by weight of the curing agent. In preferred embodiments, the waterborne curing agent is a clear aqueous solution without visible particles by visual inspection.

Water solubility or dispersibility can be achieved by salting the polyamine-polyepoxide adduct (i) and second polyamine (ii) with a volatile or non-volatile organic or inorganic acid. The degree of salting is selected to control, as desired, a number of factors such as cure temperature, cure speed, pot life and dispersibility. In general, the amine groups are reacted with sufficient acid to achieve a degree of salting from about 2% to about 40%, or about 2% to about 30%, or about 2% to about 25%, or about 2% to about 20%, or about 3% to about 20%, or about 2% to about 15%. The "degree of salting" means the number of amine nitrogen equivalents reacted with an acid expressed as a percentage of the total number of amine nitrogen equivalents in the system. Suitable acids include both volatile and non-volatile, and organic and inorganic acids. A volatile acid will substantially completely evaporate at the temperature at which drying and curing occur. The organic acids may be aliphatic, cycloaliphatic, or heterocyclic and may be saturated or unsaturated with up to 10 carbon atoms. Representative organic acids include acetic acid, formic acid, propionic acid, butyric acid, acrylic acid, methacrylic acid and cyclohexanoic acid, succinic acid, sebacic acid, and sulfamic acid. The organic acid will preferably be an aliphatic monocarboxylic acid having up to 4 carbon atoms. Representative volatile inorganic acids include hydrochloric acid and hydrobromic acid. The preferred acids are acetic, formic and propionic acids.

Another aspect of the invention discloses a process for preparing an epoxy curing agent composition by (i) reacting a first polyamine containing primary amine functionality and a first polyepoxide having an epoxide equivalent weight (EEW) in the range of 130 to about 500 in a ratio of moles of polyamine per equivalents of polyepoxide sufficient to provide an amine terminated intermediate (a), wherein the ratio of first polyamine to first polyepoxide is greater than one mole of polyamine per equivalent of epoxide, (ii) reacting intermediate (a) with urea or formaldehyde to form an amine terminated intermediate (b), (iii) reacting intermediate (b) with a second polyepoxide having an epoxide equivalent weight (EEW) in the range of 200 to about 1000 to form an amine terminated intermediate (c), (iv) end capping intermediate (c) with a monoepoxide composition comprising an aromatic glycidyl ether or an alkyl substituted aromatic glycidyl ether, or a combination of both, to form a polyamine-polyepoxide adduct, and (v) contacting the polyamine-polyepoxide adduct with a second polyamine having two or more active amine hydrogens, wherein the second polyamine is different from the first polyamine.

In a preferred embodiment, the process for preparing an epoxy curing agent composition further comprises step (ia) wherein excess first polyamine is removed from intermediate (a) by distillation to yield an amine terminated adduct intermediate (ai), intermediate (ai) then being reacted with urea or formaldehyde in step (ii) to form an amine terminated intermediate (b).

In another preferred embodiment of the process, the first polyamine has an amine hydrogen equivalent weight (AHEW) from about 12 to about 50.

In another preferred embodiment of the process, intermediate (a) comprises an adduct of about two moles of polyamine and one mole of polyepoxide.

In another preferred embodiment of the process, the amount of urea or formaldehyde reacted with intermediate (a) is about 0.5% to 8% by weight to total weight of intermediate (a).

In another preferred embodiment of the process, the amount of second polyepoxide reacted with intermediate (b) is about 1% to 30% by weight to total weight of intermediate (b).

In another preferred embodiment of the process, the amount of monoepoxide composition reacted with intermediate (c) is about 1% to 25% by weight to total weight of intermediate (c).

In another preferred embodiment of the process, the second polyamine has an amine hydrogen equivalent weight (AHEW) from about 12 to about 100.

In another preferred embodiment of the process, the amount of polyamine-polyepoxide adduct in the curing agent is 70% to 98% by weight to total weight of curing agent.

In another preferred embodiment of the process, the amount of second polyamine in the curing agent is about 2% to 30% by weight to total weight of curing agent.

Polyamine-polyepoxide adduct (i) is prepared by a multiple-step process, wherein intermediate (a) and (c), and the final endcapping of intermediate (c) are prepared by amine-epoxy adduction reaction, and can be conducted over a wide temperature range, from about 40° C. to 200° C., or 60° C. to 150° C., or 60° C. to 120° C. The reaction can be conducted neat, or in the presence of a suitable solvent. The best solvents are solvents that are useful in the formulation of the final product application, such as those described below. The preferred solvents are the glycol ethers described below, and the most preferred solvent is 1-methoxy-2-propanol. In the preparation of intermediate (a), excess first polyamine is removed by vacuum distillation to keep free first polyamine below 10% by weight to the weight of intermediate (a). The vacuum distillation can be conducted over a wide range of temperature, from 80° C. to 300° C., or from 80° C. to 260° C., or from 100° C. to 260° C.

Intermediate (b) is prepared by reaction intermediate (a) with urea or formaldehyde to reduce primary amine content, and increase molecular weight, thus increasing solubility of intermediate (b) in water and extending the pot life of the curing agent. This step can be conducted in a wide temperature range and under vacuum. For the urea reaction, the reaction can be conducted between 80° C. to 250° C., or from 80° C. to 220° C., or from 80° C. to 200° C., or from 80° C. to 150° C. For the formaldehyde reaction, the reaction can be conducted between 25° C. to 150° C., or from 25° C. to 130° C., or from 25° C. to 110° C., or from 40° C. to 150° C., or from 40° C. to 110° C.

Water solubility or dispersibility of the curing agent can be further improved by salting with an organic or inorganic salt. The amine groups of the curing agent are reacted with sufficient acid to achieve about 2% to about 40%, or about 2% to about 30%, or about 2% to about 25%, or about 2% to about 20%, or about 3% to about 20%, or about 2% to about 15% the total number of amine nitrogen equivalents in the system.

The curing agent can be manufactured in a water soluble glycol ether, and the solid content can be adjusted via the addition of water and, additional glycol ether to at least 40%, or 50%, or 60%, or 65%, or 80% by weight of the total weight of the curing agent.

The curing agent of the invention has an amine hydrogen equivalent weight of 80 to 400, or 90 to 300, or 100 to 300, or 100 to 250, or 100-200.

The present disclosure also provides for the use of curing agent (A) as a hardener for epoxy resins. Thus, another aspect of the invention is a curable amine-epoxy composition comprising the reaction product of curing agent (A) and a polyepoxide resin composition (B) comprising at least one multifunctional polyepoxide resin having at least two epoxide groups per molecule. The polyepoxide resin composition may be liquid or solid, and preferably solid in nature, and have an epoxide equivalent weight (EEW) based on solids of from about 150 to about 2000, preferably from about 170 to about 1000. Usually the resin mixture will consist of di- or polyepoxide resins, such as those resins previously listed as suitable for use in making the polyamine-polyepoxide adduct.

The ratio of epoxy groups in the polyepoxide resin composition (B) to active amine hydrogens in the curing agent (A) can vary from about 0.5 to about 2, and will depend on the nature of the epoxy resin employed, the application method, and the properties necessary to meet a certain market requirement. For instance, in coating applications using certain amine-epoxy compositions, incorporating more epoxy resin relative to the amount of the curing agent composition, can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 2:1 to about 0.5:1. For example, such polyamine-compositions can have stoichiometric ratios of epoxy to amine hydrogen about 2.0:1 to about 0.5:1, or about 1.5:1 to about 0.5:1, or about 1.5:1 to about 0.7:1, or about 1.3:1 to about 0.7:1, or about 1.2:1 to about 0.7:1, or about 1.1:1 to about 0.7:1, or about 1.0:1 to about 0.7:1.

Depending upon the end-use application, it can be beneficial to reduce the viscosity of the polyepoxide resin compositions by modifying with a portion of monofunctional epoxides. For example, the viscosity can be reduced to allow an increase in the level of pigment in a formulation or composition while still permitting easy application, or to allow the use of a higher molecular weight epoxy resin. Thus, it is within the scope of the present invention for the polyepoxide resin composition, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, C4 to C14 alcohols, and the like, or combinations thereof. The polyepoxide resin composition may be used as is, or it may be dissolved in an appropriate solvent, or it may be employed as an already formed emulsion or dispersion in water or water/cosolvent blend. It will be recognized by those skilled in the art that the use of solvent or a water/cosolvent blend may be required with solid epoxy resins or extremely viscous liquid epoxy resins.

It will usually be advantageous to include one or more organic solvents in one or both components of the curable amine-epoxy composition. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol.

It will frequently be advantageous to include plasticizers such as benzyl alcohol, phenol, tert-butylphenol, nonylphenol, octylphenol, dodecylphenol, cardanol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris(dimethylaminomethyl)phenol.

The curable amine-epoxy composition may also include pigments and mixtures of pigments. The pigments may be ground into the epoxy resin, the curing agent, or both. They may also be incorporated with the use of a pigment grinding aid or pigment dispersant, which may be used in combination with the epoxy resin or the curing agent, or may be used alone. The use of pigment dispersants is well known to those skilled in the art of coating formulation. The composition may also contain fillers, and fibers such as glass or carbon fibers.

Other additives may also be included in the curable amine-epoxy formulation. Such additives include defoamers, surfactants, slip and mar aids, rheology modifiers, flow aids, adhesion promoters, light and heat stabilizers, corrosion inhibitors, biocide, and the like.

The present invention also is directed to articles of manufacture comprising the curable amine-epoxy compositions disclosed herein. The article of manufacture can comprise an amine-epoxy composition which comprises the reaction product of a curing agent and a polyepoxide resin composition. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, slip and mar aids, rheology modifiers, adhesion promoters, light and heat stabilizers, corrosion inhibitor, and any combination thereof.

Articles of manufacture include, but are not limited to, adhesives, coatings, primers, sealants, curing compounds, construction products, flooring products, and composite products. Further, such coatings, primers, sealants, or curing compounds can be applied to metal or cementitious substrates. Specifically, the curable amine-epoxy compositions are used in metal coatings, in particular container coatings. Coatings based on these amine-epoxy compositions can be solvent-free or can contain diluents, such as water or organic solvents, as needed for the particular application. Coatings can contain various types and levels of pigments for use in paint and primer applications. Curable amine-epoxy coating compositions comprise a layer having a dry film thickness ranging from 10 to 200 μm (micrometer), preferably 20 to 120 μm, more preferably 25 to 100 μm, for use in a protective coating applied on to metal substrates. In addition, for use in a flooring product or a construction product, coating compositions comprise a layer having a thickness ranging from 50 to 10000 μm, depending on the type of product and the required end-properties. A coating product that delivers limited mechanical and chemical resistances comprises a layer having a dry film thickness ranging from 50 to 500 μm, preferably 100 to 300 μm; whereas a coating product such as, for example, a self-leveling floor that delivers high mechanical and chemical resistances comprises a layer having a thickness ranging from 800 to 10,000 μm, preferably 1,000 to 5,000 μm.

Numerous substrates are suitable for the application of coatings of the present invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of the present disclosure, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

The invention is further illustrated by the following examples, which are not to be construed as imposing limitations to the scope of this invention. Various other aspects, embodiments, modifications, and equivalents thereof which, after reading the description herein, may suggest themselves to one of ordinary skill in the art without departing from the spirit of the present disclosure or the scope of the appended claims.

EXAMPLES

Example 1

The synthesis of curing agent (A) was carried out in the following 4 steps.

Step 1: 348 g of Ancamine® 2655 was charged to a 500 mL four neck round bottom flask, equipped with vacuum line, a dropping funnel, a nitrogen outlet and stir bar. The content was heated to 80° C. under stirring. 115 g of Diglycidyl ether bisphenol A epoxy resin (EEW=220-240), pre-heated at 80° C. was added to the flask over a 2 hour period. After epoxy resin addition, the temperature was maintained at 80° C. for an additional hour to complete the reaction. The flask was heated to 200° C. to distill excess free amine under vacuum until free amine was <5 wt % to yield intermediate (c).

Step 2: The reaction mixture from Step 1 was cooled down to 140° C., and 3.9 g of urea was charged into the flask over a period of 30 mins to react with intermediate (c). The reaction was continued for 4 hours to yield intermediate (d).

Step 3: The reaction mixture from Step 2 was cooled down to 90° C., and 31.65 g (0.05 mol) of diglycidyl ether bisphenol A epoxy resin (EEW=450-500), 75% solid in xylene was introduced into reaction by dropping funnel for a period of 1 hour. Xylene was removed by vacuum distillation to yield intermediate (e). The reaction product was end capped with 15 g (0.03 mol) of cashew nut oil glycidyl ether at 100° C. for an hour to yield intermediate (i). The reaction product was then blended with 10.62 g of Isophorone diamine (IPDA) to yield intermediate (ii).

Step 4: To the reaction mixture from Step 3 was added 111 g of water to produce curing agent (A) with a solid content of 70%, amine hydrogen equivalent weight (AHEW) of about 130 and a Gardner color of 6-8 with clear amber liquid.

Example 2

Example 2 utilized the same synthesis process as described in Example 1. Step 1, 292 g of triethylenetetramine (TETA) was employed. Step 4, 200 g of water and 45 g of 1-Methoxy-2-propanol (PM) were employed to prepare 50% solid waterborne curing agent with AHEW=175 based on aqueous amine solution and Gardner color of 6-8 with clear amber liquid.

Example 3

Example 3 utilized the same synthesis process as described in Example 1. Step 1, 292 g of triethylenetetramine (TETA) was employed. Step 2, 3.9 g of urea was employed. Step 3, 29.2 g of diglycidyl ether bisphenol A (EEW=450-500), 75% in 1-methoxy-2-propanol (PM), 9.7 g of NC513 and 9.7 g of IPDA was employed. Step 4, 101 g of water was employed to prepare 70% solid waterborne curing agent with AHEW=125 based on amine solution and Gardner color of 6-8 with clear amber liquid.

Example 4

Example 4 utilized the same synthesis process as described in Example 1. Step 1, 292 g of triethylenetetramine (TETA) was employed. Step 3, 9.7 g of Jeffamine D230 was employed. Step 4, 59 g of water was employed to prepare 80% solid waterborne curing agent with AHEW=105 based on aqueous amine solution and Gardner color of 6-8 with clear amber liquid.

Example 5

Example 5 utilized the same synthesis process as described in Example 3, except in step 2, no urea was charged into the reactor. In step 4, 100 g of water was employed to prepare 70% solid content waterborne curing agent with AHEW=115 based on aqueous amine solution and Gardner color of 6-8. The finished curing agent is a semi-transparent liquid.

Example 6

Example 6 utilized the same synthesis process as described in Example 1. Step 2, 3.9 g of formaldehyde was employed. 146 g of water was added in flask to prepare 60% solid content waterborne curing agent with AHEW=145 based on aqueous amine solution and Gardner color of 6-8 with clear amber liquid.

Example 7

Step 1: A 300 g of diethylenetriamine (DETA) was charged to a 500 mL four neck round bottom flask, equipped with vacuum line, a dropping funnel, a nitrogen outlet and stir bar. The content was heated to 80° C. under stirring. 95 g of Diglycidyl ether bisphenol A epoxy resin (EEW=184-190), pre-heated at 80° C. was added to the flask over a 2 hour period. After epoxy resin addition, the temperature was maintained at 80° C. for an additional hour to complete the reaction. The flask was heated to 180° C. to distill excess free amine under vacuum until free amine was <4 wt % to yield intermediate (c).

Step 2: The reaction mixture from Step 1 was cooled down to 130° C., and 5 g of urea was charged into the flask over a period of 30 mins to react with intermediate (c). The reaction was continued for 4 hours to yield intermediate (d).

Step 3: The reaction mixture from Step 2 was cooled down to 90° C., and 45 g of diglycidyl ether bisphenol A epoxy resin (EEW=450-500), 75% solid in xylene was introduced into reaction by dropping funnel for a period of 1 hour. Xylene was removed by vacuum distillation to yield intermediate (e). The reaction product was end capped with 18 g of cresyl glycidyl ethers (CGE) at 100° C. for an hour to yield intermediate (i). The reaction product was then blended with 9 g of bis(3-aminopropyl) diethylene glycol ether (available as Ancamine® 1922A, from Evonik Corporation) to yield intermediate (ii). Then 4.5 g of acetic acid was charged at 70° C.

Step 4: To the reaction mixture from Step 3 was added 144.5 g of water to produce curing agent (A) with a solid content of 60%, amine hydrogen equivalent weight (AHEW) of about 170 and a Gardner color of 6-8 with clear amber liquid.

Example 8

A clear coat formulation is prepared by commercial epoxy resin dispersion as Part A and curing agent, water and co-solvent as Part B. Detailed formulation of clear coat components is shown in Table 1. EPIKOTE™ 6520-WH-53A: 53% solid content with EEW=1040, viscosity (Brookfield, 25° C. cP) 1000-6000, is an aqueous dispersion from Hexion and Ancarez™ AR555: 55% solid content with EEW=1300, viscosity (Brookfield, 25° C. cP) 200, an aqueous dispersion from Evonik Corporation. The inventive examples use the curing agent from Example 3, and the comparative examples employ the curing agent from Example 5 and a commercially available waterborne curing agent based on epoxy-amine adduct.

Dipropylene n-butyl ether (DPnB) and 1-methoxy-2-propanol (PM) are used as co-solvent, commercially available from DOW.

The test methods used in the examples include but are not limited to those shown in Table 2.

Firstly, prepare wet film, using wet film applier and draw down method, wet film thickness is 100μ, then put all panels into constant lab room for 7 days at 23° C., then test all clear coat films performance, like compatibility of epoxy dispersion and curing agent, finished film gloss and film dry speed as shown in Table 2. The mole ratio of epoxide group/amine group is 1.3/1, epoxide group is in excess 30% stoichiometry by mole ratio. Resulting data in Table 3 shows both commercial curing agent and curing agent of example 3 and 5 can give good compatibility as cured with two commercial epoxy dispersions. Table 3 shows that Inventive formulation 1, Comparative formulation 1 and Comparative formulation 3 give different pencil hardness, a pencil hardness of 2H, as compared with Inventive formulation 2, Comparative formulation 2 and Comparative formulation 4, which is a result from different epoxy dispersions. The adhesion test used is the method of ASTM 03359, executed by pressing adhesive tape over x-cut film, then pulling off tape to check how much coating film was removed from panel with 0-10 scale, big rating number means excellent performance, SB indicating no coating film was removed from substrate and 0 indicating coating film was completely removed from x-cut area under the tape. No matter which type of epoxy dispersion was used in Table 1, the curing agent used in Examples 3 and 5 exhibit similar clear coat properties as commercially available curing agent.

TABLE 1

| Clear coat formulation | | | | | | |
|---|---|---|---|---|---|---|
| | Inventive formulation 1 | Inventive formulation 2 | Comparative formulation 1 | Comparative formulation 2 | Comparative formulation 3 | Comparative formulation 4 |
| Part A components by weight | | | | | | |
| EPIKOTE ™ 6520-WH-53A: 53% solid content with EEW = 1040, aqueous dispersion | 100 | | 100 | | 100 | |
| Ancarez ™ AR555: 55% solid content with EEW = 1300, aqueous dispersion | | 100 | | 100 | | 100 |

TABLE 1-continued

| Clear coat formulation | | | | | | |
|---|---|---|---|---|---|---|
| | Inventive formulation 1 | Inventive formulation 2 | Comparative formulation 1 | Comparative formulation 2 | Comparative formulation 3 | Comparative formulation 4 |
| Part B components by weight | | | | | | |
| Waterborne curing agent using of Example 3, AHEW = 125 | 9.2 | 7.4 | | | | |
| Commercial waterborne curing agent, AHEW = 150 | | | 11.1 | 8.9 | | |
| Waterborne curing agent using of Example 5, AHEW = 115 | | | | | 8.5 | 6.8 |
| Dipropylene n-butyl ether (DPnB) | 1 | 1 | 1 | 1 | 1 | 1 |
| 1-methoxy-2-propanol (PM) | 5 | 5 | 5 | 5 | 5 | 5 |
| DI water | 15 | 15 | 15 | 15 | 15 | 15 |

Note:
mole ratio epoxide/amine = 1.3/1

TABLE 2

| Testing methods | |
|---|---|
| Test items | Test method |
| Film surface gloss (20o/60o/85o) | ISO 2813 (also DIN 67530) |
| Pencil hardness: | ASTM D3363-92a |
| Film Flexibility | ASTM D522-93a |
| Adhesion | ASTM D3359-93 |
| Salt spray resistance | ASTM D610-2008, ASTM D714-2009, JTT 810-2011 |
| Dry time | ASTM D5895 |
| Film thickness test | ASTM D7091-13 |

TABLE 3

| Clear coat properties test using curing agent of example 3 and 5 cured at 23° C. for 7 days | | | | | | |
|---|---|---|---|---|---|---|
| Samples | Dry film thickness/um | Surface gloss 20°/60°/85° | Pencil hardness | Adhesion | Finish surface appearance | Flexibility/mm |
| Inventive formulation 1 | 18 | 105/127/92 | 2H | 5B | Clear and transparent | 1 mm |
| Inventive formulation 2 | 21 | 109/128/91 | H | 5B | Clear and transparent | 1 mm |
| Comparative formulation 1 | 17 | 105/129/90 | 2H | 5B | Clear and transparent | 1 mm |
| Comparative formulation 2 | 19 | 95.8/124/91 | H | 5B | Clear and transparent | 1 mm |
| Comparative formulation 3 | 18 | 92/102/98 | 2H | 5B | Clear and transparent | 1 mm |
| Comparative formulation 4 | 22 | 98/104/97 | H | 5B | Clear and transparent | 1 mm |

Example 9

Differentiation performance test: Early clear coat film performance as cured under high temperature with high humidity for 7 days (5000/98% relative humidity)

Based on traditional waterborne coating experience, with respect to solvent based epoxy coating, waterborne coating film shows poor film performance at an early stage, poor humidity resistance and poor corrosion resistance. In order to find out whether the inventive curing agent gives good properties when cured with an epoxy dispersion under high humidity at an early stage, a special test method was conducted.

Firstly, prepare wet film in the same manner as in example 8. Clear coat formulation is repeated as in Table 1. Draw down the wet film, then put film into bake oven at 50° C. for 30 mins, transfer film into a chamber with 50° C. and 98% humidity immediately, then cure for 7 days. The film properties are summarized in Table 4.

TABLE 4

| Clear coat differentiation properties using curing agent of example 3 after curing 7 days at 50° C. with 98% humidity | | | | | | |
|---|---|---|---|---|---|---|
| Sample | DFT/um | Surface Gloss 20°/60°/85° | Pencil hardness | Adhesion (Grade) | finish surface appearance | Flexibility/mm |
| Inventive formulation 1 | 21 | 78/98/90 | 3H | 4B | clear and slightly blanching | 1 mm |
| Inventive formulation 2 | 19 | 87/97/94 | 2H | 4B | clear and slightly blanching | 1 mm |
| Comparative formulation 1 | 17 | 83/111/91 | 3H | 0B | Severe blanching | 3 mm |
| Comparative formulation 2 | 20 | 89/115/90 | 2H | 0B | Severe blanching | 2 mm |
| Comparative formulation 3 | 18 | 67/91/82 | 3H | 0B | Severe blanching | 3 mm |
| Comparative formulation 4 | 19 | 79/95/78 | 3H | 0B | Severe blanching | 2 mm |

Adhesion rating: 5B- no film loss, excellent; 0B- complete failure, poor
Flexibility rating: 1 mm, detection limit, excellent Although the performance of clear coatings cured at room temperature in Table 3 did not show too much difference, analysis of coating results in Table 4 clearly show coatings based on the curing agent of this invention (Example 3) were superior to commercial waterborne curing agent and Example 5 systems in early humidity resistance when cured at high humidity and high temperature, with noticeable improved adhesion, flexibility and surface appearance. The coatings using the curing agent of the present invention show good compatibility with different commercial resin dispersions such as EPIKOTE™ 6520-WH-53A or Ancarez™ AR555 as demonstrated by their good adhesion and flexibility, whereas, adhesion of the commercial curing agent and Example 5 was very poor at 0, and flexibility increased to 2 or 3 mm. Surface appearance also showed similar results. The curing agent of this invention maintains acceptable surface appearance even after being cured under high humidity test, whereas the commercial curing agent and Example 5 have severe blanching surface. Both kinds of data indirectly show that the curing agent of example 3 has good humidity resistance at high temperature at early stage.

Example 10

In order to find whether the inventive curing agent has good properties in full formulation, a protective coating primer formulation was prepared as shown below in Table 5. Detailed coating performance, like touch dry speed, pot life, impact resistance, gloss, adhesion and salt spray resistance are shown in Table 6, Table 7 and Table 8.

Component A and Component B in Table 5 was mixed thoroughly and left for 15 mins at 23° C. as induction time before spray. The viscosity was about 60Ku of obtained mixture of component A/B (KU method). The mixture coating was then sprayed to Q panel 7.6×15.2 cm for salt resistance test and 6.6×40 cm for other mechanical performance test. Film gloss was measured after 24 hours at 2300, and other performance, like adhesion, flexibility and pencil hardness were measured after a 7 day cure at 2300.

TABLE 5

| Protective coating primer formulation for metal using curing agent of example 3 | | | | | | |
|---|---|---|---|---|---|---|
| | | | Inventive formuation 3 | Inventive formuation 4 | Comparative formulation 5 | Comparative formulation 6 |
| A-Component | | | | | | |
| 1 | Epoxy resin dispersion | Ancarez AR555 | 48.27 | | 48.27 | |
| | | EPIKOTETM 6520 | | 48.27 | | 48.27 |
| 2 | Defoamer | Surfynol DF-58 | 0.55 | 0.55 | 0.55 | 0.55 |
| 3 | Cosolvent | 1-methoxy-2-propanol (PM) | 0.5 | 0.5 | 0.5 | 0.5 |
| 4 | Cosolvent | Dipropylene n-butyl ether (DPnB) | 1 | 1 | 1 | 1 |
| 5 | Bentone LT | Elementis | 0.3 | 0.3 | 0.3 | 0.3 |
| 6 | Dispersing agent | Disperbyk 190 | 1.36 | 1.36 | 1.36 | 1.36 |

TABLE 5-continued

| Protective coating primer formulation for metal using curing agent of example 3 | | | | | | |
|---|---|---|---|---|---|---|
| | | | Inventive formuation 3 | Inventive formuation 4 | Comparative formulation 5 | Comparative formulation 6 |
| 7 | Filler | Talc (600mesh) | 25.93 | 25.93 | 25.93 | 25.93 |
| 8 | Pigment TiO | Ti-Pure R-902 | 9.55 | 9.55 | 9.55 | 9.55 |
| Total | | | 87.46 | 87.46 | 87.46 | 87.46 |
| Charge components 1~3 and stir homogeneous at low shear | | | | | | |
| Slowly add pigment and fillers while increasing speed to 10~20 m/s | | | | | | |
| High speed dispersing at approx. 10~20 m/s for 20 mins | | | | | | |
| B-component | | | | | | |
| 9 | waterborne curing agent | Curing agent using in example 3, AHEW = 125 | 3.57 | 4.46 | | |
| | | Commercial curing agent, AHEW = 150 | | | 4.28 | 5.36 |
| 10 | additives | Acetic acid | 0.10 | 0.10 | 0.10 | 0.10 |
| 11 | co-solvent | 1-methoxy-2-propanol (PM) | 1 | 1 | 1 | 1 |
| 12 | | Dipropylene n-butyl ether (DPnB) | 0.5 | 0.5 | 0.5 | 0.5 |
| 13 | Diluent | Di water | 1.5 | 1.5 | 1.5 | 1.5 |
| Total | | | 6.67 | 7.56 | 7.38 | 7.46 |

Note:
stoichiometry epoxide/amine group = 1.3/1

Performance data of curing agent was observed and described herein, cured with two commercially available epoxy dispersions as shown in Table 6. The inventive curing agent of Example 3 has competitive mechanical properties as compared to the commercial waterborne curing agent, both curing agent/epoxy systems show excellent impact resistance, good adhesion on Q-panel, good flexibility and fast hardness build-up.

Pot life is also one important parameter and a challenge for waterborne epoxy coating systems, especially for waterborne container coatings, if short pot life, resulting in productive efficiency, poor sagging resistance and poor adhesion as spray in container substrate on site. Viscosity stability, coating film gloss and mechanical properties (flexibility/adhesion) were utilized to track coating system pot life. When used in two commercially available epoxy dispersions, Ancarez™ AR555 and EPIKOTE™ 6520, the curing agent of example 3 (Inventive formulation 3 and Inventive formulation 4) and commercial curing agent exhibited viscosity stability and stable gloss over long pot life. However, based on flexibility and adhesion tests, the commercial curing agent only gives 2 hours pot life, whereas the inventive curing agent gives over 5 hours pot life.

TABLE 6

Performance of protective coating primer for metal using curing agent of example 3 Cured at 23° C. for 7 days

| Sample | DFT/um | Pot life (h) vs dry film gloss | Pot life (h) vs flexibility and adhesion | Pot life (h) vs mixture viscosity | Pencil hardness | Adhesion (Grade) | Direct Impact resistance cm · kg | Flexibility/ mm |
|---|---|---|---|---|---|---|---|---|
| Inventive formuation 3 | 43 | 5 | 5 | 5 | 2H | 5B | 80 | 1 mm |
| Inventive formuation 4 | 39 | 4 | 5 | 4 | 3H | 5B | 70 | 1 mm |
| Comparative formulation 5 | 41 | 4 | 2 | 5 | H | 5B | 60 | 1 mm |
| Comparative formulation 6 | 37 | 4 | 2 | 4 | H | 5B | 60 | 1 mm |

Adhesion rating: 5B- no film loss, excellent; 0B- complete failure, poor
Flexibility rating: 1 mm, detection limit, excellent

TABLE 7

| Differentiation performance test: full formulation coating performance cured under high temperature with high humidity for 7 days (50° C./98% relative humidity) | | | | |
|---|---|---|---|---|
| Sample | DFT/um | Pencil hardness | Adhesion (Grade) | Flexibility/mm |
| Inventive formuation 3 | 45 | 3H | 4B | 1 mm |
| Inventive formuation 4 | 43 | 3H | 4B | 1 mm |
| Comparative formulation 5 | 46 | 2H | 2B | 2 mm |
| Comparative formulation 6 | 43 | 2H | 0B | 2 mm |

Adhesion rating: 5B- no film loss, excellent; 0B- complete failure, poor
Flexibility rating: 1 mm, detection limit, excellent Due to the semi-closed container box, water of the interior topcoat can not completely come out in the production line. Once the container is offline, the door will be closed and water will evaporate to the overhead of the container, which often leads to coating failure in corrosion and adhesion at an early stage. Therefore, early waterborne coating performance, such as early humidity resistance is very important and customers will benefit from this advantage.

Although the performance of clear coatings cured at room temperature in Table 6 did not show too much difference in adhesion and flexibility, full formulation results in Table 7 and FIG. 1 clearly demonstrate the superior coating performance of using the curing agent of the invention, especially early humidity resistance as displayed by excellent hardness development, flexibility and adhesion. All the coatings were sprayed on Q panel. The excellent coating performance can be attributed to fast through cure and more hydrophobic nature of the coating compared to the system using commercial waterborne curing agent.

Salt spray resistance is a direct measurement to show coating barrier properties. In order to study overall performance of the inventive curing agent used in a waterborne interior container coating (waterborne container coating standard: JTT 810-2011, Zinc-rich primer, dry film thickness 30μ+interior epoxy top coat, dry film thickness 40-50μ), one zinc rich primer starting formulation was developed as shown in Table 8. The formulation in Table 5 was used for the interior epoxy top coat. Corrosion resistance testing results are summarized in Table 9. The same zinc-rich primer formulation and similar layer thickness were used, and any performance differences were a result from the interior top coating layer. Based on the salt spray test data, the curing agent of example 3 used in inventive formulations 3 and 4 show excellent corrosion resistance with respect to commercially available waterborne curing agent.

TABLE 8

| Zinc-rich primer starting formulation | | |
|---|---|---|
| Part A components | Raw materials | Weight % |
| 1 | Tego Airex 901W (EVONIK) | 0.18 |
| 2 | 1-methoxy-2-propanol (PM) | 4.94 |
| 3 | Dipropylene n-butyl ether (DPnB) | 2.28 |
| 4 | Bentonite SD-2 | 1.35 |
| 5 | Ancamide 2839 | 2.45 |
| 6 | Zinc powder | 65 |
| 7 | sylosiv 3A molecular sieve | 0.47 |
| 8 | 1-methoxy-2-propanol (PM) | 0.74 |
| 9 | A380 flash rust agent | 0.47 |
| Total A | | 77.88 |
| Part B Components | Ancarez AR555 (SER dispersion) | 22.12 |
| Total A + B | | 100 |

TABLE 9

| Salt spray resistance tests results based on ASTM D610-2008, ASTM D714-2009 | | | |
|---|---|---|---|
| Sample | Whole coating layer thickness DFT/um | Salt spray resistance test (h)/Rating | Performance target based on coating standard: JTT 810-2011b |
| Inventive formuation 3 | 78 | a > 940 hours, Rating 10 | 600 hours, Rating 10 |
| Inventive formuation 4 | 73 | a > 940 hours, Rating 10 | 600 hours, Rating 10 |
| Comparative formulation 5 | 76 | 680 hours, Rating 9 | 600 hours, Rating 10 |
| Comparative formulation 6 | 81 | 630 hours, Rating 9 | 600 hours, Rating 10 |

Note:
NaCl 5% aqueous, 35° C., Rating 10, no bubble on the film, Rating 9, some sample bubble on the film.
a, manual stop salt spray test at 940 h, no film defects was found.
b, JTT 810-2011, China Waterborne container coating standard

The invention claimed is:

1. A curing agent composition comprising the product of the reaction of a first polyamine containing primary amine functionality and a first polyepoxide having an epoxide equivalent weight (EEW) of 130 to 500 in a ratio of moles of polyamine per equivalents of polyepoxide sufficient to provide an amine terminated intermediate (a) comprising an adduct of about two moles of polyamine and one mole polyepoxide, intermediate (a) being then reacted with urea or formaldehyde to provide an amine terminated intermediate (b), intermediate (b) being then reacted with a second polyepoxide having an EEW of 200 to 1000 to provide an amine terminated intermediate (c), intermediate (c) being end capped with a monoepoxide composition comprising an aromatic glycidyl ether or an alkyl substituted aromatic glycidyl ether, or a combination of both, to form a polyamine-polyepoxide adduct, and contacting the polyamine-polyepoxide adduct with a second polyamine having two or more active amine hydrogens, wherein the second polyamine is different from the first polyamine.

2. The composition of claim 1, wherein excess first polyamine is removed from intermediate (a) by distillation to yield an amine terminated adduct intermediate (ai), intermediate (ai) then being reacted with the urea or formaldehyde to form the amine terminated intermediate (b).

3. The composition of claim 1, wherein the first polyamine has an amine hydrogen equivalent weight (AHEW) from about 12 to about 50.

4. The composition of claim 1, wherein the amount of urea or formaldehyde reacted with intermediate (a) is 0.5% to 8% by weight to total weight of intermediate (a).

5. The composition of claim 1, wherein the amount of second polyepoxide reacted with intermediate (b) is 1% to 30% by weight to total weight of intermediate (b).

6. The composition of claim 1, wherein the amount of monoepoxide composition reacted with intermediate (c) is 1% to 25% by weight to total weight of intermediate (c).

7. The composition of claim 1, wherein the second polyamine has an amine hydrogen equivalent weight (AHEW) from about 12 to about 100.

8. The composition of claim 1, wherein the amount of polyamine-polyepoxide adduct in the curing agent is 70% to 98% by weight to total weight of curing agent.

9. The composition of claim 1, wherein the amount of second polyamine in the curing agent is about 2% to 30% by weight to total weight of curing agent.

10. A process for preparing an epoxy curing agent composition comprising the following steps i) reacting a first polyamine containing primary amine functionality and a first polyepoxide having an epoxide equivalent weight (EEW) in the range of 130 to about 500 in a ratio of moles of polyamine per equivalents of polyepoxide sufficient to provide an amine terminated intermediate (a), wherein the ratio of first polyamine to first polyepoxide is greater than one mole of polyamine per equivalent of epoxide, ii) reacting intermediate (a) with urea or formaldehyde to form an amine terminated intermediate (b), iii) reacting intermediate (b) with a second polyepoxide having an epoxide equivalent weight (EEW) in the range of 200 to about 1000 to form an amine terminated intermediate (c), iv) end capping intermediate (c) with a monoepoxide composition comprising an aromatic glycidyl ether or an alkyl substituted aromatic glycidyl ether, or a combination of both, to form a polyamine-polyepoxide adduct, and v) contacting the polyamine-polyepoxide adduct with a second polyamine having two or more active amine hydrogens, wherein the second polyamine is different from the first polyamine.

11. The process of claim 10, further comprising step (ia) wherein excess first polyamine is removed from intermediate (a) by distillation to yield an amine terminated adduct intermediate (ai), intermediate (ai) then being reacted with urea or formaldehyde in step (ii) to form an amine terminated intermediate (b).

12. The process of claim 10, wherein the first polyamine has an amine hydrogen equivalent weight (AHEW) from about 12 to about 50.

13. The process of claim 10, wherein intermediate (a) comprises an adduct of about two moles of polyamine and one mole of polyepoxide.

14. The process of claim 10, wherein the amount of urea or formaldehyde reacted in step (ii) is 0.5% to 8% by weight to total weight of intermediate (a).

15. The process of claim 10, wherein the amount of second polyepoxide reacted in step (iii) is 1% to 30% by weight to total weight of intermediate (b).

16. The process of claim 10, wherein the amount of monoepoxide composition reacted in step (iv) is 1% to 25% by weight to total weight of intermediate (c).

17. The process of claim 10, wherein the second polyamine has an amine hydrogen equivalent weight (AHEW) from about 12 to about 100.

18. The process of claim 10, wherein the amount of polyamine-polyepoxide adduct in the curing agent is 70% to 98% by weight to total weight of curing agent.

19. The process of claim 10, wherein the amount of second polyamine in the curing agent is about 2% to 30% by weight to total weight of curing agent.

20. An amine-epoxy composition comprising the reaction product of a curing agent according to claim 1 and a polyepoxide resin composition.

* * * * *